United States Patent [19]

Dakin

[11] Patent Number: 4,743,980

[45] Date of Patent: May 10, 1988

[54] AUDIO CARRIER AMPLITUDE CONTROL FOR VIDEODISC RECORDER

[75] Inventor: W. Ray Dakin, Huntington Beach, Calif.

[73] Assignee: Optical Disc Corporation, Cerritos, Calif.

[21] Appl. No.: 817,866

[22] Filed: Jan. 13, 1986

[51] Int. Cl.$^4$ ............................................. H04N 5/76
[52] U.S. Cl. .................................. 358/342; 358/340; 358/343
[58] Field of Search ...................... 358/335, 343, 342; 360/19.1

[56] References Cited

U.S. PATENT DOCUMENTS

| | | | |
|---|---|---|---|
| 3,830,968 | 8/1974 | Redlich et al. | 358/335 |
| 4,051,533 | 9/1977 | Griffiths | 360/19.1 |
| 4,225,873 | 9/1980 | Winslow | 358/342 |
| 4,525,751 | 6/1985 | Freeman et al. | 358/342 |
| 4,616,356 | 10/1986 | Wilkinson et al. | 369/116 |

*Primary Examiner*—Donald McElheny, Jr.
*Attorney, Agent, or Firm*—Steven P. Brown

[57] ABSTRACT

A videodisc recorder signal processing system and a recording method providing programmed control of the amplitude of the secondary (audio channel) carrier signals relative to the primary (video channel) carrier signal during recording. In one embodiment, the amplitude of the two audio carrier signals are varied in accordance with a preprogrammed profile to counteract the MTF effects of the recording system. In another embodiments, the amplitudes of the two audio carriers are varied in accordance with a preprogrammed pattern related to the relative criticality of the audio and video information recorded on the disc. The signal characteristics of the audio channels are improved by increasing the amplitude of the audio carriers. When no audio information exists, the audio carrier signals are substantially eliminated to maximize the quality of the video channel. At other times, the audio carrier signals are decreased to improve the video quality by reducing IM products.

9 Claims, 2 Drawing Sheets

AUDIO CARRIER AMPLITUDE CONTROL FOR VIDEODISC RECORDER

FIELD OF THE INVENTION

The present invention relates to the field of optical video disc information storage systems. More particularly, the present invention relates to a signal processing system and a recording method allowing programmed control of the amplitude of the audio channel carrier signals relative to the video channel carrier signal to minimize interference between the carriers and to allow flexibility in the resultant signal-to-noise ratios of the audio and video channels on a single recorded videodisc.

DESCRIPTION OF THE PRIOR ART

The optical videodisc is now a well established storage medium in use throughout the world. The medium is defined by the so called "Laservision" videodisc standard published by the International Electrotechnical Commission (IEC). As defined by that specification, the medium includes a full bandwidth video information channel and two separate audio information channels.

During recording, each of the separate information channels is encoded using a separate frequency modulated (FM) carrier signal. The three resulting modulated carrier signals are then summed together to control an optical modulator used in writing the information on the disc.

The writing process is discussed in greater detail in U.S. Pat. No. 4,225,873 entitled "Recording and Playback System."

The frequencies and relative amplitudes of the three carrier signals are defined by the IEC specification for videodiscs. This specification allows for a compromise between the bandwidths and signal-to-noise ratios of the two audio information channels and the video information channel, making maximum use of the bandwidth of the optical videodisc. The compromise involves the presence of a small amount of intermodulation (IM) distortion in the reproduced video signal in order to allow an acceptable audio signal-to-noise ratio of approximately 65 dB. While this compromise is satisfactory for the recording of most video and audio information, it is marginal or inadequate for certain videodisc applications.

For instance, certain videodiscs contain digital player control program information encoded as a digital FM code signal on one of the audio information tracks during selected portions of the videodisc. The bandwidth and signal-to-noise ratio of the audio information tracks recorded under the IEC standard are only marginally adequate for reproducing this digital programming signal. Since the accurate reproduction of this signal affects not just a momentary audio portion of the disc, but the operability of an entire interactive disc, it is advantageous to deviate from the IEC specifications when recording videodiscs with program dumps.

On the other hand, many videodiscs include "still frames" of video information with appropriate control codes causing the videodisc player to "freeze" on this particular frame. The frame may be a still picture of considerable complexity and it is often desirable for such still frame segments to be reproduced with a maximum bandwidth and a minimum of noise and IM products. Such an improvement in the quality of the video channel can be obtained by reducing the amplitude of the audio carriers.

Because the player cannot reproduce audio information when it is "frozen" on a still frame, the audio carriers usually carry no information during the still frame segments and the decrease in amplitude of the carriers has no ill effect. However, such a change in carrier levels requires a deviation from the IEC specification and the changes of carrier level must be synchronized with the occurrence of the still frames in order to avoid degradation of audio information before and after the still frames.

In other program material, both video and audio information exist simultaneously, but the video information is more critical that the audio information. For instance, the video information may be conveying detailed training information, whereas the audio channels contain only narration which is relatively narrow in bandwidth and insensitive to noise. In such instances, it is desirable to make a minor deviation from the IEC specification to increase the video quality while maintaining the audio channels with a slightly degraded quality.

Since all of the above discussed conditions can exist on a single videodisc, and since all of the above discussed situations require unique deviations from the IEC standard, a need exists for a recording system and method which allows the customizing of the recording process and parameters to fit the criticality of the information on each of the videodisc channels and to modify the recording parameters as that criticality changes over the length of the videodisc recording.

Independent of the information content of the audio and video channels on the videodisc, the recording process itself suffers from certain physical limitations which make it desirable to selectively alter the recording parameters during the recording of each videodisc. As more completely described in U.S. patent application Ser. No. 586,675 filed Mar. 6, 1984 U.S. Pat. No. 4,616,356, and entitled "Aperture Compensation Signal Processor for Optical Recording" (commonly assigned with the subject application), all recording systems have a modulation transfer function (MTF) which decreases the bandwidth of the medium with decreasing radius. Because the video carrier signal is of a higher frequency than the two audio carrier signals, this bandwidth variation affects the video carrier more than the audio carriers. The above referenced patent application discusses a system for counteracting the bandwidth variation effects on the video information channel. However, such systems do not address the problem of the overall change in amplitude ratio between the audio carriers and the video carrier with radius caused by this changing MTF. Therefore, a need exists for a system and method which provide for the changing of the amplitude of the audio carrier signals with radius during the recording process to maintain the desired amplitude ratio between the audio carriers and the video carrier actually recorded on the disc.

SUMMARY OF THE PRESENT INVENTION

Accordingly, it is an object of the present invention to provide a system and method which allows for customizing the compromise between the signal-to-noise ratio and bandwidth of the video and audio channels to best fit the actual video and audio information being recorded at each instant on a videodisc.

Additionally, it is an object of the present invention to allow for instantaneous change between recording parameters to adapt the recording system to changing priorities in the recorded information.

It is a further object of the present invention to provide a system and method in which the amplitude of the audio carrier signals is varied with radius to counteract the effects of the MTF variations of the recording system with radius.

In its broadest aspect, the present invention comprises a signal processing system and videodisc recording method in which the amplitudes of the two audio carrier signals are selectively altered during the recording process in a predetermined fashion.

In its most basic embodiment, the present invention provides a system in which the amplitudes of the two audio carrier signals are varied in accordance with a preprogrammed profile to counteract the MTF effects of the recording system. In this way, the relative amplitudes of the audio carriers and the video carrier as actually recorded on the disc, remain relatively constant over the entire disc.

In a more advanced embodiment of the invention, the amplitudes of the two audio carriers are varied in accordance with a preprogrammed pattern related to the relative criticality of the audio and video information recorded on the disc. For example, when one of the audio channels contains a digital program dump, the signal characteristics of the audio channels are improved by increasing the amplitude of the audio carriers for the duration of the program dump. Alternatively, during freeze frame segments when no audio information exists, the audio carrier signals are substantially eliminated to maximize the quality of the video channel. At other times when full bandwidth audio characteristics are not required, the audio carrier signals are decreased below the levels set by the IEC standard to improve the video quality by reducing IM products.

This pattern of audio carrier signal amplitude variation may be established by previewing the information to be recorded on the videodisc and storing audio carrier amplitude control codes associated with video frame indicating codes to predefine all of the changes in the recording parameters. During the recording process, the system compares the code number of the video frame being recorded with the stored amplitude change point codes and implements each of the stored instructions at the respective preselected video frame.

Further aspects and advantages of the invention will become apparent in connection with the description of the following preferred embodiments.

DESCRIPTION OF THE PREFERRED EMBODIMENTS

The basic components of a videodisc recorder are well known in the art and are shown, for example, in above-mentioned U.S. Pat. No. 4,225,873. In order to properly understand the present invention, it is merely necessary to understand that the signal processing portion of a videodisc recorder converts three channels of voltage varying with time information into a composite FM spectrum consisting of the summation of three separate carrier signals. This resultant signal is used to modulate a recording beam of light above and below a threshold level such that the zero crossings of the resultant FM signal are represented as transitions between altered and unaltered areas arranged in a spiral track on the recorded videodisc. The length and spacing of the altered areas represents respective half cycles of the FM summation signal.

Figure 1:
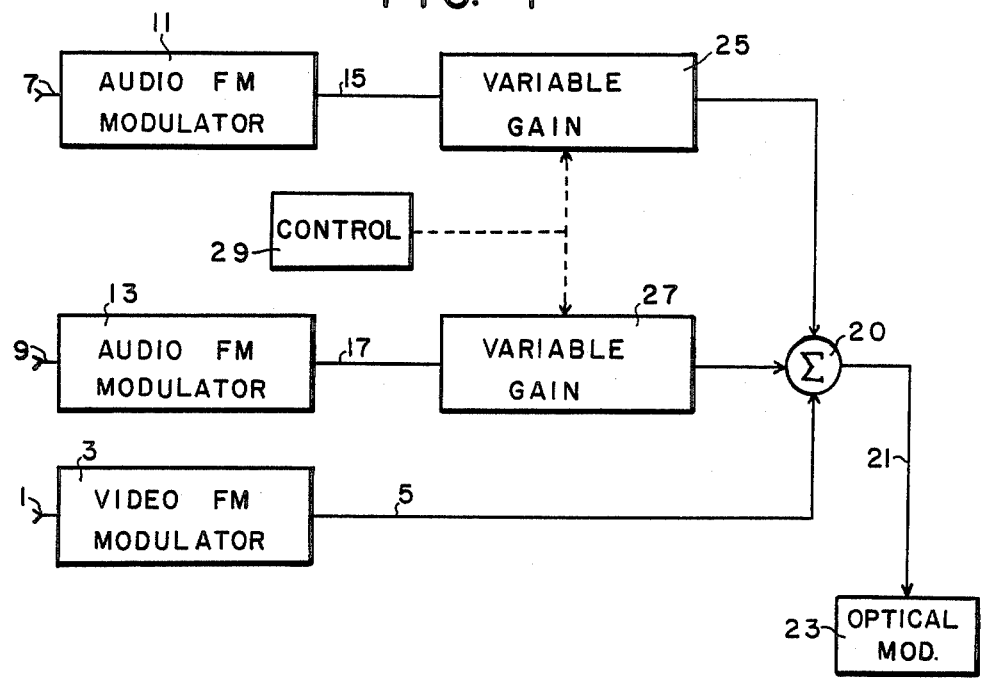
FIG. 1 is a simplified block diagram of the frequency modulator section of a videodisc recorder incorporating the present invention.

FIG. 1 shows a preferred embodiment of the signal processing circuitry for such a videodisc recorder. A video input signal 1 is fed to a video VCO (voltage controlled oscillator) 3 which produces a video carrier signal frequency modulated in accordance with the video information. Two audio information signals 7, 9 control respective audio VCO's 11, 13 to produce frequency modulated audio carriers 15, 17. The video carrier 5 and the audio carriers 15, 17 are summed together at summing point 20 to produce a composite FM spectrum signal 21 which controls writing beam light intensity modulator 23.

In accordance with the present invention, frequency modulated audio carriers 15 and 17 pass through controllable gain stages 25 and 27, respectively. The gains of these two stages are controlled by carrier amplitude controller 29. While FIG. 1 shows the gain of both stages 25 and 27 being controlled together by a single controller 29, it is within the scope of the present invention to include two separate controllers for independently controlling the amplitude of the two audio carriers.

Preferably, the gain control stages 25 and 27 are constructed so that the amplitudes of the audio carrier signals can be increased above the $-26$ dB level (relative to the video carrier) set by the IEC videodisc standard, or reduced to a level below this standard. When the level of the carriers is above the IEC standard level, the signal-to-noise ratio of the audio channels is improved proportionately. However, the higher amplitude audio carriers will increase the amount of intermodulation distortion present in the recovered video signals. When the audio carriers are reduced below the IEC standard level, the recovered audio signal will be degraded, but the intermodulation products present in the recovered video signal will be reduced, thereby increasing the quality of the recovered video signal.

Figure 2:
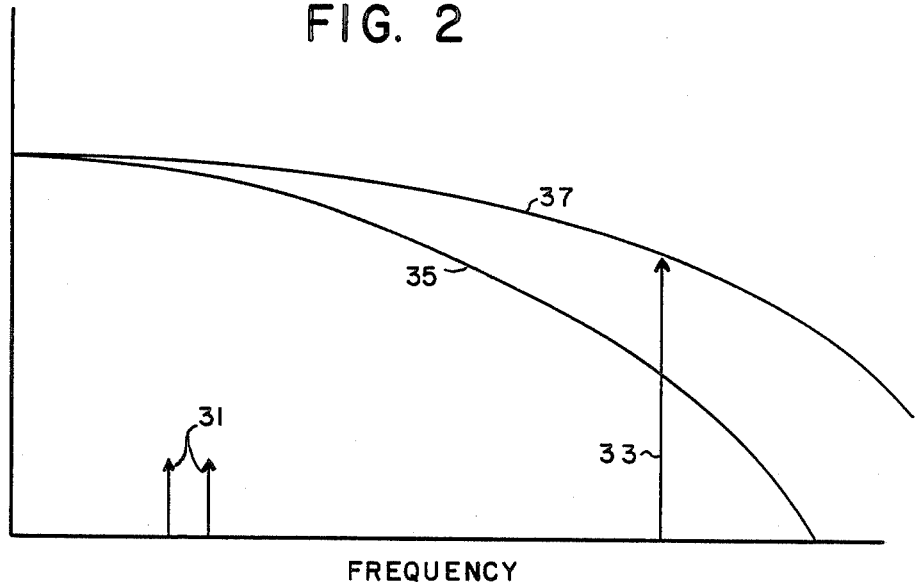
FIG. 2 is a plot of the modulation transfer function of a videodisc recorder showing the change in the MTF with radius at the three carrier frequencies.

FIG. 2 is a plot of the modulation transfer function (MTF) of a typical videodisc recording system. The two audio carrier center frequencies and amplitudes are indicated by the arrows 31. The video carrier center frequency and amplitude are indicated by the arrow 33.

The MTF at small radii is shown as the curve 35. The MTF at larger radii is represented by the curve 37. Since the curves are very close together at the frequencies of the audio carriers, it is clear that the recording of the audio carriers is not significantly affected by radius. However, the distance between the two curves at the video carrier frequency indicates the radius dependency of the video carrier level.

Signal processing systems such as discussed in the above mentioned U.S. Pat. No. 4,616,356 boost the amplitude of the video carrier at higher frequencies to flatten the level of the recorded video carrier over its full modulation range. The amount of boost is varied with radius to compensate for the changing MTF. However, such systems do not compensate completely for radius, and the mean amplitude of the recorded video carrier will still be proportional to radius. Since the IM products present in the recovered video signal are substantially proportional to the amplitudes of the audio carriers relative to the video carrier, the IM products will be greater at small radii unless the relative amplitudes of the carriers are corrected. Since only the zero crossings of the composite signal are recorded on the disc, decreasing the amplitude of the audio carriers is equivalent to increasing the amplitude of the video carrier and is sometimes preferable.

For a given change in radius, the ideal proportion of change in the audio carrier amplitude is the same as the proportional change in the MTF at the center frequency of the video carrier.

Figure 3:
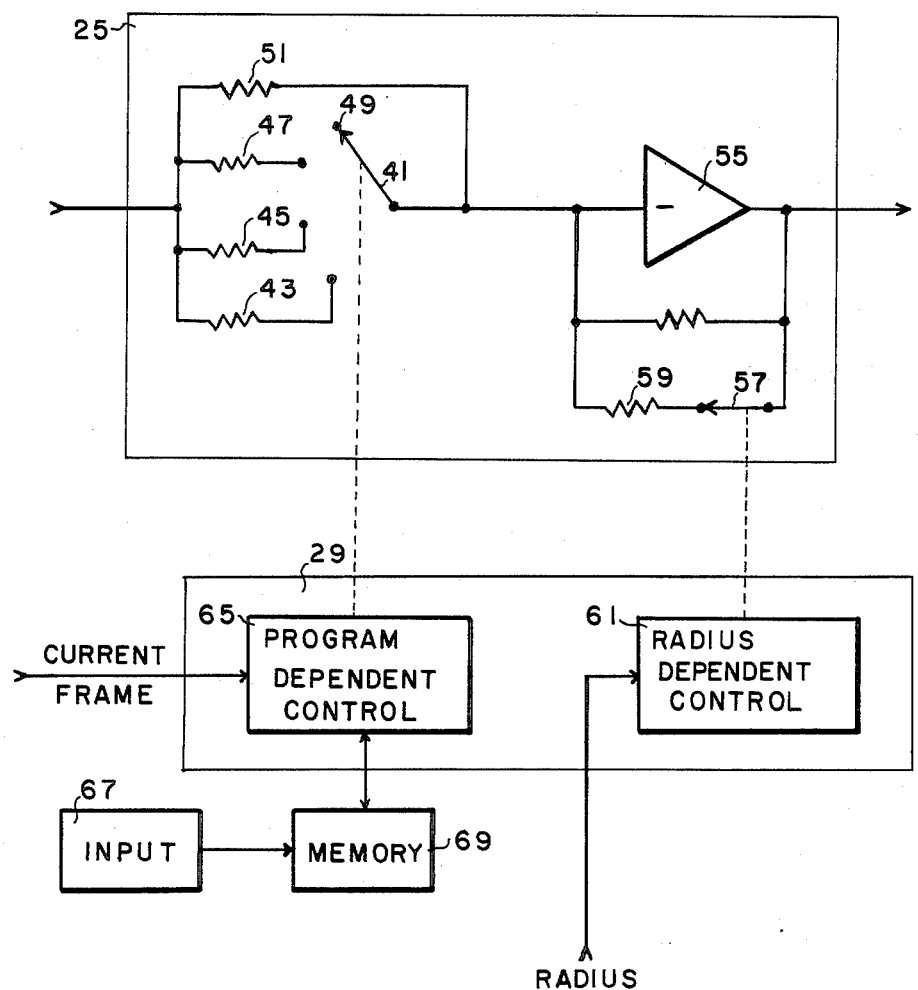
FIG. 3 is a block diagram of one channel of a preferred implementation of the audio carrier amplitude control system of the present invention.

FIG. 3 shows an idealized block diagram of the preferred embodiment for one of the gain control stages 25 and for the controller 29. As shown in this figure, the variable gain stage 25 may be implemented using a multiple position switch 41 (or a series of single-throw switches) for selecting a circuit path through one of a plurality of series resistors. When the switch is positioned such that audio carrier signal 15 is directed through resistor 43, the gain of the stage will be relatively high and the amplitude of the audio channel carrier signal will be greater than that specified by the IEC specification. When the switch 41 is manipulated such that the carrier passes through resistor 45, the amplitude of the carrier signal will be reduced to the level specified by the IEC standard. When the switch selects the circuit path through resistor 47, the carrier signal is further attenuated such that it is at an amplitude below that specified by the IEC standard. When the switch is in the position 49, the only path for the carrier signal is through leakage resistance 51. If desired, this resistor can be eliminated so that no audio carrier signal will be passed when the switch is in the position 49. However, this means that the audio demodulator in the videodisc player will have no signal to lock to and will drift with noise on the disc, resulting in substantial amplitude white noise output by the player. This can be prevented by appropriately choosing leakage resistor 51 to provide an amplitude of carrier signal which is sufficient for the videodisc player audio demodulator to lock to, but which does not cause any measurable intermodulation distortion in the video signal. A carrier level of $-46$ dB (relative to the video carrier) has been found appropriate for this purpose.

In addition to the amplitude varying function afforded by multiposition switch 41, it is advantageous to have a further control over the amplitude of the audio carrier signals that is radius dependent. In order to simplify the control circuitry, it is advantageous to isolate the functioning of the signal content controlled switch 41 from the radius dependent control. As shown in FIG. 3, this can easily be implemented by using a program controlled switch 41 in the input circuit of an operational amplifier 55 and placing a separate gain controlling element 57 in the feedback loop of the same operational amplifier.

As shown in the figure, the radius dependent gain changing element 57 may be embodied as a simple switch which provides a one step change in the audio carrier amplitude at a predefined radius on the disc. For example, when the switch 57 is closed, the the gain of the operational amplifier 55 will be reduced and a relatively low carrier amplitude will be output. Due to the reduced level of the video carrier recorded on the disc at small radii due to the MTF of the recording system, the reduced audio carrier amplitude with the switch 57 closed will result in the recording of the audio carriers at the proper amplitude relative to the recorded video carrier. When the recording has progressed to a larger radius such that the change in the MTF over the recorded radial distance has resulted in an increase in the recorded video carrier signal proportional to the gain change effected by opening the switch 57, the control system 29 opens the switch to maintain the proper ratio between the audio carriers and the video carrier.

It will be readily apparent to a person skilled in the art that the single switch 57 and its associated feedback resistor 59 can be replaced by a plurality of switches and resistors controllably operated at different radii to adjust the level of the audio carriers in finer steps. Similarly, the switch 57 can be replaced by a potentiometer mechanically coupled to the radially moving writing carriage, or by a voltage variable resistance controlled by a voltage which is continuously variable with radius. Either of these alternate embodiments will result in a continuously changing audio carrier amplitude with radius which may be advantageous in certain circumstances.

Additionally, while the illustrated preferred embodiment includes an information dependent amplitude control switch 41 and a separate radius dependent amplitude control device 57, both functions could be incorporated in a single multi-state switch and appropriate logic for controlling the switch to increase and decrease the gain to provide the desired playback signal qualities and to adjust the carrier amplitude with radius.

Regardless of the implementation chosen for the radius dependent amplitude control means 57, the controller 29 will require a radius dependent control section 61 which is responsive to a radius information signal 62. For the single switch embodiment pictured in FIG. 3, the radius dependent controller 61 can conveniently be implemented with a threshold detector adjusted to open the switch 57 when the radius indicating signal 62 indicates that the recorder has reached a predetermined switching radius. Similarly, if a plurality of switches 57 are used for multiple amplitude steps, the radius dependent control 61 can include a plurality of comparators, each controlling a respective switch and each triggering the switch at a respective predetermined radius.

In addition, the gain controller 29 includes a section 65 for controlling the switch 41. If it is merely desired to decrease the amplitude of the audio carriers when no input audio signal is present, the controlled section 65 could be embodied by a threshold detector (not shown) monitoring the input audio signal channels. However, in the preferred embodiment shown, the controller 65 responds to a series of commands instructing the controller to raise or lower the gain of the stage 25.

Preferably, these commands result from previously stored instructions which define a particular setting of the switch 41 commencing at defined "action points" during the program being recorded on the disc. The timing of the action points may be correlated to the program material using the frame numbers encoded with the video signal in accordance with the IEC standard, or with any other timing information associated with the program material, for example, a SMPTE time code provided with the input signal.

Naturally, in order to store the action points and the instructions associated therewith, it is necessary to preview the program material to be recorded and determine at that time the relative criticality between the information on the audio channels and the information on the video channel. Whenever this criticality changes, it is necessary to store the time indicating code and the switch position indicating code to cause the appropriate change in the audio carrier amplitude. This instruction information can be input through terminal device 67 which can be a keyboard or any other known data input device. These instructions are stored in a memory 69 in accordance with known techniques.

After all of the instructions have been entered into the memory 69, the actual recording of the videodisc begins. Control system 65 continuously monitors the current timing information 71 and executes the instructions stored in memory 69 when the current time code equals a recorded action point. In this way, the amplitude of the audio signal can be varied many times during a single videodisc. For example, the recorded instructions can control the switch 41 to increase the amplitude of the audio carrier for the specific fraction of a second during which a program dump is being recorded and can then return the audio carrier amplitude to its standard level for a normal video segment. Additionally, the instructions can control the switch 41 to substantially eliminate the audio carriers for single or multiple freeze frame periods. Finally, the instructions can instruct the switch 41 to decrease the amplitude of the audio carriers slightly to provide enhanced video quality while maintaining audio quality adequate for narration and the like.

Naturally, the carrier amplitude control system may be constructed in a variety of different ways, and the components of the system of the present invention may be arranged in different ways to fit particular applications. Accordingly, it is intended that the invention not be limited by the disclosed embodiments, but only by the appended claims.

What is claimed is:

1. In a recorder for videodiscs including: means for generating a primary carrier signal and at least one secondary carrier signal, means for frequency modulating each of said carrier signals to represent a respective channel of information, and means for summing said modulated carrier signals together and recording the sum on a videodisc, the improvement comprising:

memory means for storing pre-entered instructions regarding increasing and decreasing the amplitude of said at least one secondary carrier signal and for storing selected time points of the input signal at which the amplitude of said at least one secondary carrier signal is to be altered;

control means for selectively altering the amplitude of said at least one secondary carrier signal during recording, such that the relative amplitudes of the carrier signals in the sum of signals to be recorded are altered; and means for sensing the occurrence of the selected time points of the input signal and for activating said control means.

2. The improvement as claimed in claim 1, wherein the center frequency of said at least one secondary carrier signal is lower than the center frequency of said primary carrier signal and wherein said control means increases the amplitude of said secondary carrier signal as the radius on the disc increases.

3. The improvement as claimed in claim 2, wherein said control means increases the amplitude of said secondary carrier signal in a stepwise fashion at predetermined radii.

4. The improvement as claimed in claim 2, wherein the proportion of increase in the amplitude of the secondary carrier signal over a given radial distance is approximately equal to the proportion of change in the modulation transfer function of the recording system at the center frequency of the primary carrier signal over that same radial distance.

5. A signal processor for use in a videodisc recorder, comprising:

means for generating a frequency modulated video carrier signal representing an input video bandwidth signal;

means for generating two separate frequency modulated audio carrier signals representing respective audio bandwidth input signals;

means for summing said modulated carrier signals together to be recorded on a videodisc;

memory means for storing pre-entered instructions regarding increasing and decreasing the amplitudes of said audio carriers and for storing information indicating the selected frames of the input video signal at which the amplitudes of said audio carrier signals are to be altered;

control means for selectively altering the amplitude of said audio carrier signals during recording, such that ratio of the amplitudes of the audio carrier signals relative to the amplitude of the video carrier signal in the sum of signals to be recorded is altered; and means for sensing the occurrence of the selected frames of the input video signal and for activating said control means.

6. The signal processor as claimed in claim 5, wherein the center frequencies of said audio carrier signals are lower than the center frequency of said video carrier signal and wherein said control means increases the amplitudes of said audio carrier signals as the radius on the disc increases.

7. The signal processor as claimed in claim 6, wherein said control means increases the amplitudes of said audio carrier signals in a stepwise fashion at predetermined radii.

8. The signal processor as claimedin claim 6, wherein the proportion of increase in the amplitudes of the audio carrier signals over a given radial distance is approximately equal to the proportion of change in the modulation transfer function of the recording system at the center frequency of the video carrier signal over that same radial distance.

9. A method of recording a videodisc to minimize interference between the video carrier signal and the audio carrier signals, comprising the steps of:

previewing the information to be recorded and storing instructions for increasing the amplitudes of, decreasing the amplitudes of, and substantially eliminating the audio carriers and storing indications of selected frames of the input video signal at which the amplitudes of said audio carrier signals are to be altered;

generating a frequency modulated video carrier signal representing an input video bandwidth signal;

generating two separate frequency modulated audio carrier signals representing respective audio bandwidth input signals;

sensing the occurrence of the selected frames of the input video signal during recording and selectively altering the amplitude of said audio carrier signals during recording in accordance with the stored instructions, such that ratio of the amplitudes of the audio carrier signals relative to the amplitude of the video carrier signal is altered; and summing said modulated carrier signals together and recording them on a videodisc.

* * * * *